Jan. 9, 1968   O. LEY   3,362,759
CONNECTING MEANS FOR TRACK LINK MEMBERS
Filed Feb. 28, 1966

INVENTOR
Otto Ley

United States Patent Office 3,362,759
Patented Jan. 9, 1968

3,362,759
CONNECTING MEANS FOR TRACK
LINK MEMBERS
Otto Ley, Remscheid, Germany, assignor to Diehl K.G., Remscheid, Germany
Filed Feb. 28, 1966, Ser. No. 530,639
Claims priority, application Germany, Mar. 2, 1965, D 46,646
7 Claims. (Cl. 305—59)

ABSTRACT OF THE DISCLOSURE

Connector for connecting the ends of track link bolts in which the connector is prevented from slipping off the bolts by an element in the connector which engages notches provided in the bolts and which is disposed at least in part in engagement with the side of a tightening bolt in the connector opposite the links into which the link bolts extend.

The present invention relates to a safety arrangement for use in connection with track connectors which is adapted to prevent the connector at the ends of the link bolts from accidentally sliding off the link bolts, while the connector is provided with a member adapted to be inserted into recesses of the link bolts and common to both link bolts.

It is an object of the present invention to provide a safety arrangement for use in connection with track connectors, which will make it possible without the employment of tools, i.e. manually, to insert the safety member.

It is also an object of this invention to provide a safety arrangement as set forth in the preceding paragraph, which once inserted will be protected against outer influences and will also prevent accidental loss thereof.

It is still another object of this invention to provide a safety arrangement as set forth above, which will consist of a minimum of parts.

These and other objects and advantages of the invention will appear more clearly from the following specification in connection with the accompanying drawing, in which.

Figure 1:
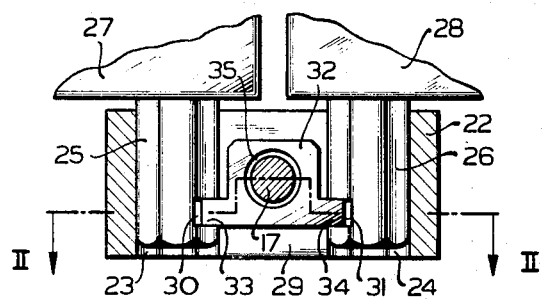
FIG. 1 is a longitudinal section through a track connector which is clamped fast on the link bolts and is secured in its position by means of an arrangement according to the invention, said section being taken along the line I—I of FIG. 2.

In conformity with the present invention, the heretofore customary spring member, which after the assembly of the chain or track is clamped into the track, is replaced by a rigid safety member which prior to the mounting of the connector onto the link bolts is inserted into recesses or cutouts of the link bolts.

This safety member may be of a block-shaped or rod-shaped design or may consist of circularly or semicircularly bent strap material. The said safety member is arranged on that side of a clamping screw which faces away from the chain links, said clamping members being employed for clamping the connector to the link bolts. Thus, a sliding off of the connector from the link bolt is no longer possible. This is the case even when, as it sometimes happens in practice, the head of the clamping screw pops off. It will be appreciated that with the arrangement according to the present invention, the shank of the bolt screwed into the connector cannot drop out. The safety member according to the invention may be provided with a recess or cutout or opening through which the clamping screw is passed after the connector has been slipped over.

As receiving bore or opening in the connector there is provided a slot which interconnects the clamping eyes and serves for clamping fast the connector. This slot does not require any machining. The openings in the link bolts are formed by tangential milled cuts into which the safety member is insertable from both sides. Inasmuch as these cuts are arranged near the end of the link bolt, the strength of the bolt will not be affected and the depth of the cuts can be selected sufficiently deep in order to assure a safe holding of the safety device even when the link bolt is offset in axial direction.

Referring now to the drawing in detail, according to FIGS. 1 to 6, in a connector 22 two clamping eyes 23, 24 for the link bolts 25, 26 of chain links 27, 28 are interconnected by means of a slot 29. The width of the slot can be narrowed by means of a clamping screw 17 screwed into the link in transverse direction thereof. When slot 29 is narrowed, link bolts 25, 26 are firmly clamped in the clamping eyes 23, 24. Within the area of application of the connector 22, the link bolts 25, 26 have tangentially milled-in cutouts 30, 31 which are differently spaced from the chain links 27, 28 respectively.

Figure 2:
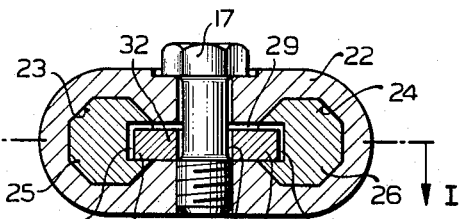
FIG. 2 represents a section taken along the line II—II of FIG. 1.

Inserted into the cutouts 30, 31 of the link bolts 25, 26 illustrated in FIGS. 1 and 2 there is a block-shaped safety member 32 provided with protrusions 33, 34. Within the area of clamping screw 17, safety member 32 is provided with a bore 35 through which, after the connector 22 has been slipped over, the screw 17 is passed and screwed into the connector 22.

Figure 3:
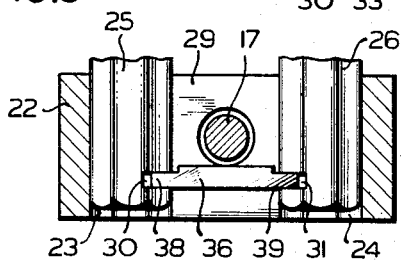
FIGS. 3 to 6 illustrate sections through a track connector of FIG. 1 with different safety arrangements modified somewhat over that of FIG. 1.
Figure 4:
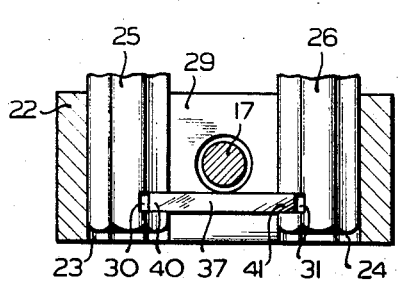

According to FIGS. 3 and 4, simplified rod-shaped safety members 36, 37 are by means of their ends 38, 39 and 40, 41 respectively inserted into the cutouts 30, 31 of the link bolts 25, 26.

Figure 5:
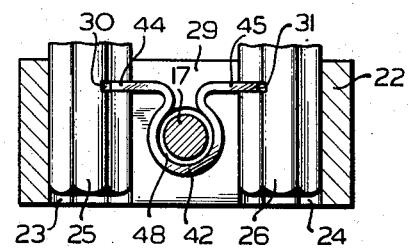
Figure 6:
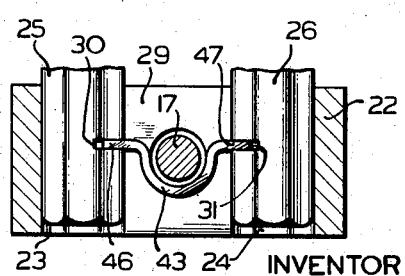

Instead of block-shaped or rod-shaped safety members, it is also possible, in conformity with FIGS. 5 and 6, to employ safety members 42 or 43 which are bent of strap material. More specifically, the safety member illustrated in FIG. 5 is bent in such a way that it forms an opening 48 for passing the clamping screw 17 therethrough. To permit an introduction into the cutouts 30, 31 of link bolts 25, 26, the safety members 42 is provided with outwardly bent ends 44, 45 which are in alignment with each other.

The semicircularly bent safety member 43 illustrated in FIG. 6 corresponds to the safety members 36 and 37 of FIGS. 3 and 4. This safety member 43 likewise has aligned ends 46, 47 by means of which it is inserted into cutouts 30, 31 of the link bolts 25, 26 respectively.

It is, of course, to be understood that the present invention is, by no means, limited to the particular embodiments illustrated in the drawing but also comprises any modifications within the scope of the appended claims.

What I claim is:

1. In the combination with chain links having two link bolts arranged in substantially parallel spaced relationship with regard to each other and having that end of said bolts which is remote from the respective link pertaining thereto provided with a cutout: a connector member provided with two transverse bores respectively arranged in axial alignment with said link bolts and receiving the same, said connector member being provided with chamber means in the form of a slot interconnecting said bores and thus interconnecting said cutouts in said link bolts, safety locking means arranged in said chamber means and engaging the cutouts of both of said link bolts, and threaded bolt means extending rotatably through said connector member on one side of said chamber means and threadedly engaging said connector member on the other side of said chamber means and holding said safety locking means and said link bolts in place, said slot being of uniform height from end to end and said safety locking means having a thickness throughout which is slightly less than the height of said slot.

2. An arrangement according to claim 1, in which said cutouts in said link bolts form tangential grooves of such a substantial depth and said safety locking means extends into said grooves to such a depth as to prevent said safety locking means for accidentally leaving said cutouts even if said link bolts are axially offset.

3. An arrangement according to claim 1, in which said safety locking means is engaged by that side of said threaded bolt means which faces away from said chain links.

4. An arrangement according to claim 1, in which said safety locking means has an aperture therethrough, and in which said threaded bolt means extends through said aperture.

5. An arrangement according to claim 1, in which said safety locking means is block-shaped and has two oppositely located extensions engaging said cutouts.

6. An arrangement according to claim 1, in which said safety locking means consists of flat strip material and comprises an intermediate region formed to an approximately annular configuration for receiving said threaded bolt means and also comprises lateral extensions at the ends extending into said cutouts.

7. An arrangement according to claim 1, in which said safety locking means consists of flat strip material while comprising an intermediate region formed to an approximately semicircular configuration for engagement with said threaded bolt means and while also comprising oppositely located lateral extensions at the ends engaging said cutouts.

References Cited

UNITED STATES PATENTS

| | | | |
|---|---|---|---|
| 2,738,236 | 3/1956 | Haushalter | 305—36 |
| 2,957,731 | 10/1960 | Backhaus | 305—36 X |

RICHARD J. JOHNSON, *Primary Examiner.*